United States Patent
Wu et al.

(10) Patent No.: US 11,837,802 B2
(45) Date of Patent: Dec. 5, 2023

(54) LIQUID CRYSTAL ANTENNA UNIT AND LIQUID CRYSTAL PHASED ARRAY ANTENNA

(71) Applicants: BEIJING BOE SENSOR TECHNOLOGY CO., LTD., Beijing (CN); BOE TECHNOLOGY GROUP CO., LTD., Beijing (CN)

(72) Inventors: Jie Wu, Beijing (CN); Tienlun Ting, Beijing (CN); Xiangzhong Kong, Beijing (CN); Xue Cao, Beijing (CN); Ying Wang, Beijing (CN); Liang Li, Beijing (CN); Haocheng Jia, Beijing (CN); Peizhi Cai, Beijing (CN); Chuncheng Che, Beijing (CN)

(73) Assignees: BEIJING BOE SENSOR TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 567 days.

(21) Appl. No.: 16/973,636

(22) PCT Filed: Sep. 26, 2019

(86) PCT No.: PCT/CN2019/108204
§ 371 (c)(1),
(2) Date: Dec. 9, 2020

(87) PCT Pub. No.: WO2020/063766
PCT Pub. Date: Apr. 2, 2020

(65) Prior Publication Data
US 2021/0167497 A1 Jun. 3, 2021

(30) Foreign Application Priority Data
Sep. 28, 2018 (CN) .......................... 201811140473.6

(51) Int. Cl.
*H01Q 1/38* (2006.01)
*H01P 1/18* (2006.01)
(Continued)

(52) U.S. Cl.
CPC ................. *H01Q 9/20* (2013.01); *H01Q 1/38* (2013.01); *H01Q 1/48* (2013.01); *H01Q 23/00* (2013.01)

(58) Field of Classification Search
CPC ............ H01Q 1/38; H01Q 1/48; H01Q 21/06; H01Q 21/062; H01Q 23/00; H01Q 3/44;
(Continued)

(56) References Cited

U.S. PATENT DOCUMENTS 11,158,916 B2 * 10/2021 Wu .......................... H01P 1/184
11,196,134 B2 * 12/2021 Kong ...................... H01P 1/184
(Continued)

FOREIGN PATENT DOCUMENTS

CN 106154603 A 11/2016
CN 106299627 A 1/2017
(Continued)

*Primary Examiner* — Tho G Phan
(74) *Attorney, Agent, or Firm* — Nath, Goldberg & Meyer; Joshua B. Goldberg

(57) ABSTRACT

A liquid crystal antenna unit and a liquid crystal phased array antenna are provided. The liquid crystal antenna unit includes: a first substrate, a second substrate opposite to the first substrate, a liquid crystal layer between the first substrate and the second substrate, a transmission line on a first surface and extending in a first direction along the first surface, a first antenna oscillator on the first surface and arranged as an elongated dipole extending in a second direction along the first surface, a second antenna oscillator on a surface of the second substrate distal to the first substrate and at a position corresponding to the first antenna
(Continued)

oscillator, and a ground electrode on a surface of the first substrate distal to the second substrate.

20 Claims, 5 Drawing Sheets

(51) Int. Cl.
  *H01Q 9/20* (2006.01)
  *H01Q 1/48* (2006.01)
  *H01Q 23/00* (2006.01)

(58) Field of Classification Search
  CPC ............ H01Q 9/20; H01Q 1/50; H01Q 19/30; H01Q 3/36; G02F 1/1333; H01P 1/18
  See application file for complete search history.

(56) References Cited

U.S. PATENT DOCUMENTS

| | | | |
|---|---|---|---|
| 11,233,320 B2* | 1/2022 | Lu | H01Q 3/44 |
| 11,342,657 B2* | 5/2022 | Lin | H01Q 3/44 |
| 11,469,491 B2* | 10/2022 | Tseng | H01L 21/045 |
| 2018/0062272 A1 | 3/2018 | Haziza | |
| 2021/0265713 A1* | 8/2021 | Fang | H01P 1/18 |

FOREIGN PATENT DOCUMENTS

| | | |
|---|---|---|
| CN | 207624908 U | 7/2018 |
| CN | 208723092 U | 4/2019 |

\* cited by examiner

LIQUID CRYSTAL ANTENNA UNIT AND LIQUID CRYSTAL PHASED ARRAY ANTENNA

CROSS REFERENCE TO RELATED APPLICATIONS

This is a National Phase Application filed under 35 U.S.C. 371 as a national stage of PCT/CN2019/108204, filed Sep. 26, 2019, an application claiming the benefit of Chinese patent application No. 201811140473.6, filed on Sep. 28, 2018, the content of each of which is incorporated herein by reference in its entirety.

TECHNICAL FIELD

The present disclosure relates to the field of antenna technologies, and in particular, to a liquid crystal antenna unit and a liquid crystal phased array antenna including the liquid crystal antenna unit.

BACKGROUND

With the development of communication technologies, services such as "Satcom on the move" and the like are being widely used, which requires an antenna with the desired performance. Compared with an antenna based on mechanical scanning, a phased array antenna has advantages of high tracking precision, short response time and the like due to not including a mechanical control mechanism. A phased array antenna based on a material of liquid crystal may further have additional advantages of, for example, small size, low power consumption, and ease of integration with a control circuitry, and is therefore considered to be a promising solution.

SUMMARY

According to an aspect of the present disclosure, there is provided a liquid crystal antenna unit, which includes:
  a first substrate;
  a second substrate opposite to the first substrate;
  a liquid crystal layer between the first substrate and the second substrate;
  a transmission line on a first surface and arranged to extend in a first direction along the first surface, wherein the first surface is one of a surface of the first substrate proximal to the second substrate and a surface of the second substrate proximal to the first substrate;
  a first antenna oscillator on the first surface and arranged as an elongated dipole extending in a second direction along the first surface, wherein the dipole includes two poles spaced apart from each other by a gap, and the first antenna oscillator is configured to couple an electromagnetic wave between the two poles and the transmission line at the gap;
  a second antenna oscillator on a surface of the second substrate distal to the first substrate and at a position corresponding to the first antenna oscillator, wherein the second antenna oscillator has an elongated shape extending in the second direction along the surface of the second substrate distal to the first substrate, and a length of the second antenna oscillator is less than a length of the first antenna oscillator; and
  a ground electrode on a surface of the first substrate distal to the second substrate, wherein the ground electrode includes an elongated electrode portion at a position corresponding to the first antenna oscillator, the elongated electrode portion extends in the second direction along the surface of the first substrate distal to the second substrate, and a length of the elongated electrode portion is greater than the length of the first antenna oscillator.

In some embodiments, the length of the second antenna oscillator is 0.7 to 0.9 times the length of the first antenna oscillator, and the length of the first antenna oscillator is less than the length of the elongated electrode portion.

In some embodiments, the first substrate and the second substrate include a same material, and the second substrate has a thickness that is 3 to 5 times as large as a thickness of the first substrate.

In some embodiments, the first substrate and the second substrate include different materials, respectively, and a thickness of the first substrate and a thickness of the second substrate satisfy the following relationship:

$$\frac{3\sqrt{\varepsilon_1}}{\sqrt{\varepsilon_2}} \leq \frac{H2}{H1} \leq \frac{5\sqrt{\varepsilon_1}}{\sqrt{\varepsilon_2}},$$

where H1 is the thickness of the first substrate, H2 is the thickness of the second substrate, $\varepsilon_1$ is a dielectric constant of the first substrate, and $\varepsilon_2$ is a dielectric constant of the second substrate.

In some embodiments, the second substrate is a composite board including N layers of materials, where N is an integer greater than or equal to 2.

In some embodiments, the second substrate is a composite board including N layers of materials, and the dielectric constant $\varepsilon_2$ of the second substrate is calculated according to the following formula:

$$\varepsilon_2 = \sum_i^N \left(\frac{Ti}{H2} * \varepsilon_{2i}\right)$$

where $$H2 = \sum_i^N Ti,$$

Ti is a thickness of an i-th layer of material, $\varepsilon_{2i}$ is a dielectric constant of the i-th layer of material, and N is an integer greater than or equal to 2.

In some embodiments, the second antenna oscillator, the first antenna oscillator, and the elongated electrode portion are arranged such that a center of the second antenna oscillator, a center of the gap in the first antenna oscillator, and a center of the elongated electrode portion are all on a straight line perpendicular to the first substrate or the second substrate.

In some embodiments, the first direction is perpendicular to the second direction.

In some embodiments, the transmission line includes a coplanar waveguide transmission line including a signal line and two ground wires respectively on both sides of the signal line.

In some embodiments, one end of the signal line is electrically connected to one end, which is proximal to the gap, of one pole of the two poles of the dipole, and one end of one ground wire, which is closer to the other pole of the two poles of the dipole, of the two ground wires, is electrically connected to one end of the other pole proximal to the gap.

In some embodiments, the first surface is the surface of the first substrate proximal to the second substrate, the liquid crystal antenna unit further includes an electrode structure on the second surface, and the second surface is the surface of the second substrate proximal to the first substrate.

In some embodiments, the first surface is the surface of the second substrate proximal to the first substrate, the liquid crystal antenna unit further includes an electrode structure on the second surface, and the second surface is the surface of the first substrate proximal to the second substrate.

In some embodiments, the electrode structure includes a plurality of electrodes parallel to each other and extending along the second surface in a direction perpendicular to the first direction.

In some embodiments, the ground electrode further includes an additional electrode portion extending from the elongated electrode portion in a direction perpendicular to the second direction along the surface of the first substrate distal to the second substrate.

In some embodiments, an orthographic projection of the first antenna oscillator on the first substrate, an orthographic projection of the second antenna oscillator on the first substrate, and an orthographic projection of the elongated electrode portion on the first substrate overlap each other.

In some embodiments, a thickness of the liquid crystal layer is less than 100 μm.

According to another aspect of the present disclosure, there is provided a liquid crystal phased array antenna, which includes a plurality of liquid crystal antenna units in an array, wherein each of the plurality of liquid crystal antenna units is the liquid crystal antenna unit according to any one of the foregoing embodiments of the present disclosure.

In some embodiments, the first substrates of the plurality of liquid crystal antenna units as a whole are a single substrate, and the second substrates of the plurality of liquid crystal antenna units as a whole are another single substrate.

These and other aspects of the present disclosure will be clearly understood from the exemplary embodiments described below, and will be set forth with reference to the exemplary embodiments described below.

BRIEF DESCRIPTION OF THE DRAWINGS

Further details, features and advantages of the present disclosure will be described in the following exemplary embodiments, taken in conjunction with the accompanying drawings, in which.

DETAILED DESCRIPTION

Figure 1:
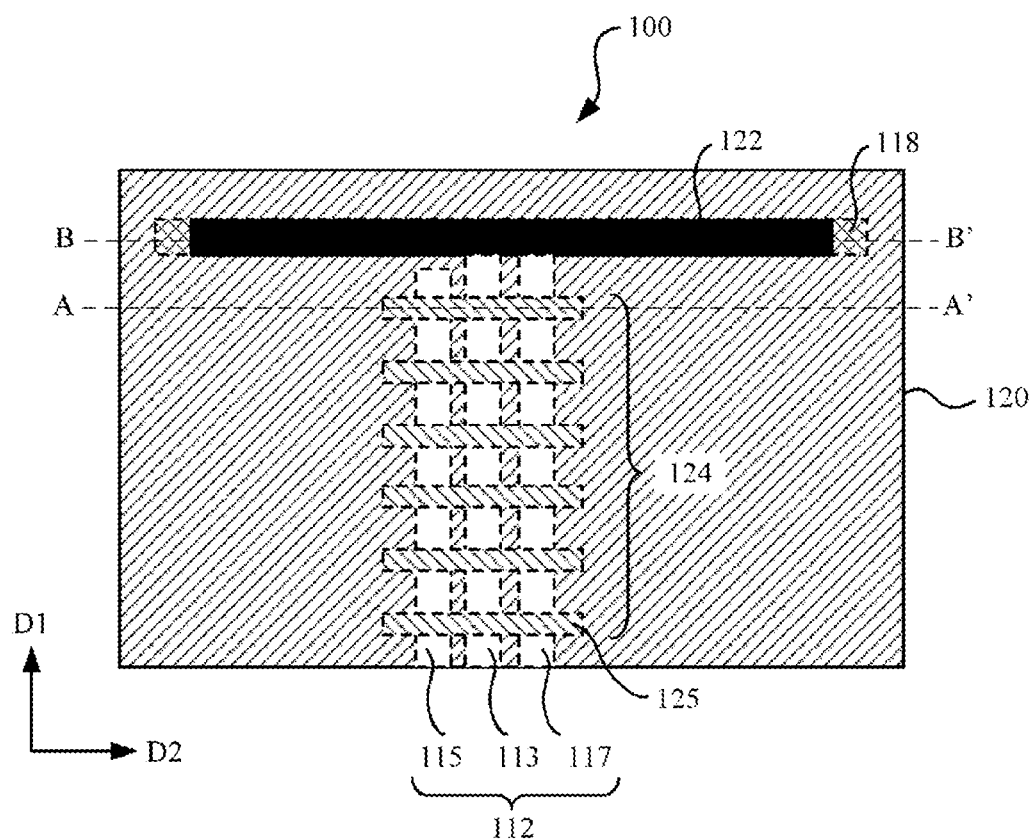
FIG. 1 schematically illustrates a top view of a liquid crystal antenna unit according to an embodiment of the present disclosure.

It should be understood that, although the terms of first, second, third, and the like may be used herein for describing various elements, components, regions, layers and/or portions, these elements, components, regions, layers and/or portions should not be limited by these terms. These terms are only used for distinguishing one element, component, region, layer or portion from another element, component, region, layer or portion. Thus, a first element, component, region, layer or portion discussed below may also be referred to as a second element, component, region, layer or portion, without departing from the teachings of the present disclosure.

Spatially relative terms such as "below . . . ," "under . . . ," "lower," "beneath . . . ," "above . . . ," "upper" and the like may be used herein for ease of description to describe a relationship between one element or feature and another element(s) or feature(s) as illustrated in the figures. It should be understood that these spatially relative terms are intended to encompass different orientations of a device in use or operation in addition to the orientation depicted in the figures. For example, if the device in the figures is turned over, an element described as "under" or "below" or "beneath" other element(s) or feature(s) would then be oriented "above" the other element(s) or feature(s). Thus, the exemplary terms "under . . . " and "beneath . . . " may encompass both orientations "above . . . " and "below . . . ". Terms such as "prior to . . . " or "before . . . " and "after . . . " or "next" may similarly be used, for example, for indicating an order in which light passes through elements. The device may be otherwise oriented (e.g., rotated 90 degrees or at other orientations) and the spatially relative descriptors used herein should be interpreted accordingly. In addition, it should also be understood that when a layer is referred to as being "between" two layers, it may be the sole layer between the two layers, or one or more intervening layers may also be present.

The terms used herein are for the purpose of describing exemplary embodiments only and are not intended to limit the present disclosure. As used herein, the singular forms "a", "an" and "the" are intended to also include the plural forms, unless the context clearly indicates otherwise. It should be further understood that the terms "comprise" and/or "include" when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It should be understood that when an element or layer is referred to as being "on," "connected to," "coupled to" or "adjacent to" another element or layer, it may be directly on, directly connected to, directly coupled to or directly adjacent to the other element or layer, or intervening elements or layers may be present. In contrast, when an element is referred to as being "directly on," "directly connected to," "directly coupled to," or "directly adjacent to" another element or layer, there are no intervening elements or layers. However, in no case should the term "on . . . " or "directly on . . . " be interpreted as requiring that one layer completely cover the underlying layer, unless otherwise stated.

Embodiments of the present disclosure are described herein with reference to schematic illustrations (and intermediate structures) of idealized embodiments of the present disclosure. As such, variations from the shapes of the illustrations as a result, for example, of manufacturing techniques and/or tolerances, are to be expected. Thus, embodiments of the present disclosure should not be construed as limited to the particular shapes of regions illustrated herein but are to include deviations in shapes that result, for example, from manufacturing. Thus, the regions illustrated in the figures are schematic in nature and their shapes are not intended to illustrate the actual shape of a region of a device and are not intended to limit the scope of the present disclosure.

Unless otherwise defined, all terms (including technical and scientific terms) used herein have the same meaning as commonly understood by one of ordinary skill in the art to which the present disclosure belongs. It should be further understood that terms, such as those defined in commonly used dictionaries, should be interpreted as having a meaning that is consistent with their meaning in the context of the relevant art and/or the present specification and will not be interpreted in an idealized or overly formal sense, unless expressly so defined herein.

Embodiments of the present disclosure will now be described in detail below with reference to the accompanying drawings.

FIG. 1 schematically illustrates a top view of a liquid crystal antenna unit 100 according to an embodiment of the present disclosure.

As shown in FIG. 1, the liquid crystal antenna unit 100 includes a second substrate 120 and a second antenna oscillator (also referred to as second antenna element) 122. The second substrate 120 is made of, for example, glass. The second antenna oscillator 122 is located on the upper surface of the second substrate 120, and has an elongated shape extending in a second direction D2 (e.g., the horizontal direction in FIG. 1) along the upper surface of the second substrate 120.

FIG. 1 further shows a transmission line 112 as indicated by dashed lines, a first antenna oscillator 118 and an electrode structure 124. The transmission line 112 is indicated by the dashed lines because the transmission line 112 is not formed on the upper surface of the second substrate 120 but is formed under the upper surface of the second substrate 120 (see, for example, FIGS. 2A and 6A). The transmission line 112 is arranged to extend in a first direction D1 (e.g., the vertical direction in FIG. 1). In the present embodiment, the first direction D1 is perpendicular to the second direction D2, but the present is not limited thereto. In some other embodiments, the first direction D1 and the second direction D2 may form any angle therebetween. Specifically, the transmission line 112 may be a coplanar waveguide (CPW) transmission line including a signal line 113 and two ground wires 115 and 117 respectively located at both sides of the signal line 113. The electrode structure 124 includes a plurality of electrodes 125 that are parallel to each other and extend in a direction (which is, in this example, the second direction D2) perpendicular to the first direction D1. In an embodiment, the plurality of electrodes 125 may be electrically insulated from each other.

Figure 4:
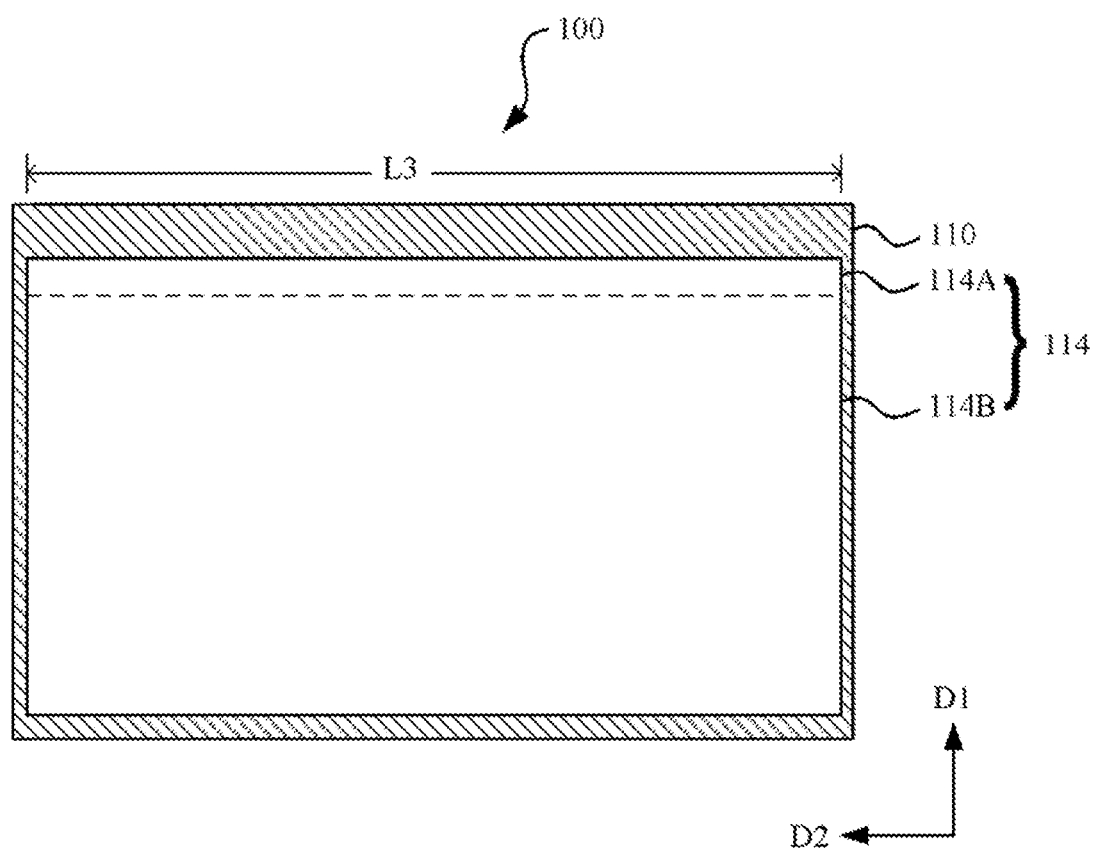
FIG. 4 schematically illustrates a bottom view of the liquid crystal antenna unit shown in FIG. 1.

It should be noted that the transmission line 112 shown in FIG. 1 is exemplary, and that any other suitable type of transmission line may be used in other embodiments, such as a grounded coplanar waveguide (CPWG) and a conventional microstrip (which may also referred to as microstrip line). In an embodiment, the grounded coplanar waveguide may include the transmission line 112 and a ground electrode (i.e., grounded electrode) 114 as shown in FIG. 4. As described above, the transmission line 112 includes the ground wire 115, the signal line 113, and the ground wire 117 that are coplanar, and the ground electrode 114 is used for grounding. In an embodiment, the microstrip may include the signal line 113 of the transmission line 112 (i.e., the ground wire 115 and the ground wire 117 of the transmission line 112 may be omitted) and the ground electrode 114 as shown in FIG. 4. In this case, the signal line 113 may be connected to one of two poles of a dipole of the first antenna oscillator 118 (a more detailed description thereof will be given later), and the ground electrode 114 may be connected to the other of the two poles of the dipole of the first antenna oscillator 118. It should be further understood that the electrode structure 124 shown in FIG. 1 is exemplary, and that the electrode structure 124 may have any other suitable pattern in other embodiments.

Figure 2A:
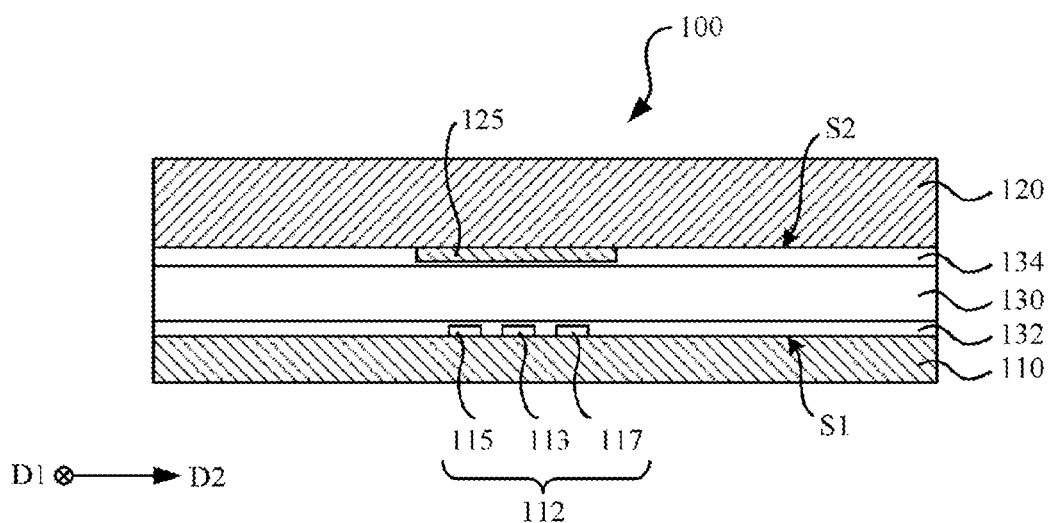
FIG. 2A schematically illustrates a cross-sectional view of the liquid crystal antenna unit as shown in FIG. 1 taken along line AA' in FIG. 1.
Figure 2B:
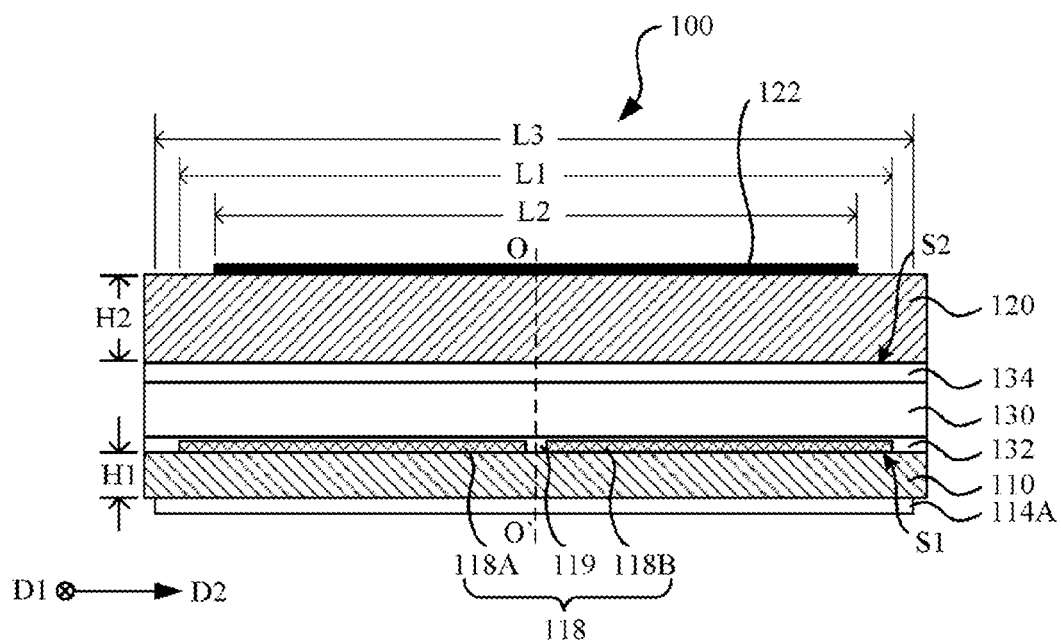
FIG. 2B schematically illustrates a cross-sectional view of the liquid crystal antenna unit as shown in FIG. 1 taken along line BB' in FIG. 1.

FIGS. 2A and 2B schematically illustrate cross-sectional views of the liquid crystal antenna unit 100 shown in FIG. 1 taken along line AA' and line BB' in FIG. 1, respectively. The structure of the liquid crystal antenna unit 100 is more clearly shown in FIGS. 2A and 2B.

Referring to FIG. 2A, the liquid crystal antenna unit 100 may further include a first substrate 110 disposed opposite to the second substrate 120 and a liquid crystal layer 130 disposed between the first substrate 110 and the second substrate 120, in addition to the above-described components. The first substrate 110 is made of, for example, glass. The liquid crystal layer 130 includes liquid crystal molecules (not shown), and has a typical thickness less than 100 μm, which may improve a response speed of the liquid crystal antenna unit 100 and reduce a size of the liquid crystal antenna unit 100. The transmission line 112 including the signal line 113, the ground wire 115 and the ground wire 117 is located on a first surface S1 (e.g., the upper surface in FIG. 2A) of the first substrate 110, and is arranged to extend in the first direction D1 along the first surface S1. In the present embodiment, the first surface S1 is a surface of the first substrate 110 proximal to the second substrate 120, and a surface of the second substrate 120 proximal to the first substrate 110 is referred to as a second surface S2, correspondingly. The plurality of electrodes 125 of the electrode structure 124 are located on the second surface S2, and extend in a direction (which is, in this example, the second direction D2) perpendicular to the first direction D1 along the second surface S2.

Each of the liquid crystal molecules in the liquid crystal layer 130 is anisotropic and has different dielectric constants in the long axis direction and the short axis direction thereof. When in operation, the transmission line 112 may transmit (or transfer) electromagnetic wave signals to a receiver (not shown) and/or from a transmitter (not shown), and a voltage is applied to the electrodes 125 of the electrode structure 124 to form a bias electric field between the electrodes 125 and the ground wires 115, 117. Due to the bias electric field between the electrodes 125 and the ground wires 115, 117, the liquid crystal molecules are rotated such that a dielectric constant of the liquid crystal layer 130 varies with the rotation of the liquid crystal molecules. When an electromagnetic wave signal is transmitted along the transmission line 112 in the liquid crystal layer 130 with the changed dielectric constant, the electromagnetic wave signal is phase-shifted to a certain extent. Thus, a phase shift of the electromagnetic wave signal may be achieved by controlling the rotation of the liquid crystal molecules in the liquid crystal layer 130, and the rotation may in turn be achieved by controlling the voltage applied to the electrode structure 124. This is a known technique referred to as a liquid crystal phase shifter. For this purpose, the liquid crystal antenna unit 100 further includes a first alignment layer 132 disposed on the first surface S1 and a second alignment layer 134 disposed on the second surface S2, as shown in FIG. 2A. Each of the first alignment layer 132 and the second alignment layer 134 may be made of, for example, polyimide for setting an initial alignment of the liquid crystal molecules in the liquid crystal layer 130 without a bias electric field. Each of the first alignment layer 132 and the second alignment layer 134 may have a conventional small thickness such that it has substantially no influence on electromagnetic wave signals transmitted on the transmission line 112.

It should be noted that the electrode structure 124 (and thus the electrodes 125 thereof) provided for the purpose of adjusting the dielectric constant of the liquid crystal layer 130 may even be optional in some embodiments, since a desired bias electric field may be established with only the transmission line 112. For example, a voltage may be applied to the signal line 113 of the transmission line 112 such that the desired bias electric field is established between the signal line 113 and each of the ground wires 115, 117 of the transmission line 112. The ground wires 115 and 117 are shown to be isolated from each other in FIGS. 1 and 3, but the present disclosure is not limited thereto. For example, in some embodiments, the ground wire 115 may be connected to the ground wire 117 by a connector (not shown).

Referring to FIG. 2B, the liquid crystal antenna unit 100 may further include the first antenna oscillator 118 in addition to the above-described components. The first antenna oscillator 118 is located on the first surface S1 and is arranged as an elongated dipole extending along the first surface S1 in the second direction D2. As shown, the dipole includes two poles 118A and 118B separated from each other by a gap 119. The first antenna oscillator 118 is configured to couple electromagnetic waves between the two poles 118A, 118B and the transmission line 112 at the gap 119.

Figure 3:
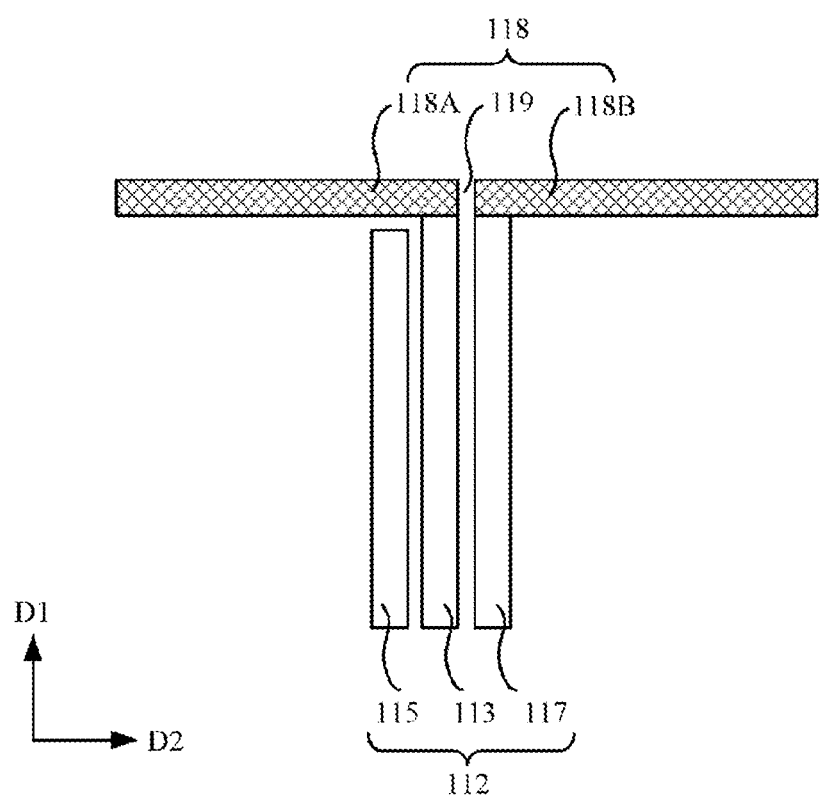
FIG. 3 schematically illustrates an arrangement of a first antenna oscillator (also referred to as first antenna element) and a transmission line of the liquid crystal antenna unit shown in FIG. 1.

FIG. 3 schematically illustrates an exemplary arrangement of the first antenna oscillator 118 and the transmission line 112.

Referring to FIG. 3, the transmission line 112 extends in the first direction D1, and the two poles 118A, 118B of the first antenna oscillator 118, which is a dipole, extend in the second direction D2. One end of the signal line 113 of the transmission line 112 is electrically connected to one of the poles 118A, 118B (in this example, the pole 118A) of the dipole on one side (the left side in FIG. 3) of the gap 119 in the first antenna oscillator 118, such that, for example, a side of the signal line 113 and a side of the pole (in this example, the pole 118A) to which the signal line 113 is connected are flush with each other. Further, one end of one of (in this example, the ground wire 117) of the two ground wires 115, 117 of the transmission line 112 is electrically connected to the other (in this example, the pole 118B) of the poles 118A, 118B of the dipole on the other side (the right side in FIG. 3) of the gap 119, such that, for example, a side of the ground wire (in this example, the ground wire 117) and a side of the pole (in this example, the pole 118B) to which the ground wire is connected are flush with each other. In a transmitting scenario, the transmission line 112 feeds an electromagnetic wave signal from a transmitter (not shown) to the first antenna oscillator 118. Alternatively, in a receiving scenario, the first antenna oscillator 118 feeds a received electromagnetic wave signal to the transmission line 112, and then the received electromagnetic wave signal is provided to a receiver (not shown) via the transmission line 112.

It should be noted that although the first antenna oscillator 118 and the transmission line 112 are shown as being perpendicular to each other in the present embodiment, the first antenna oscillator 118 and the transmission line 112 may form any suitable angle therebetween (e.g., may be parallel to each other) in other embodiments. Further, other embodiments are possible although the first antenna oscillator 118 and the transmission line 112 are shown as being directly electrically connected to each other in the present embodiment. For example, the transmission line 112 may be electromagnetically coupled to the first antenna oscillator 118 through any suitable intermediate medium.

It should be further noted that the pattern of the first antenna oscillator 118 (and more particularly the two poles 118A, 118B forming the dipole) shown in FIG. 3 is exemplary, and that in other embodiments the first antenna oscillator 118 may be a dipole having other patterns, such as a folded dipole formed by an elongated conductor. The folded dipole is known in the art, and such a folded dipole formed by the elongated conductor is also included in the "elongated" dipole of the present disclosure.

FIG. 4 schematically illustrates a bottom view of the liquid crystal antenna unit 100.

Referring to FIG. 4, the liquid crystal antenna unit 100 may further include the ground electrode 114 for grounding, in addition to the above-described components. The ground electrode 114 includes an elongated electrode portion (e.g., a first electrode portion) 114A extending in the second direction D2 along a surface of the first substrate 110 distal to the second substrate 120. The elongated electrode portion 114A has a length L3. In this example, the ground electrode 114 further includes an additional electrode portion (e.g., a second electrode portion) 114B extending from the elongated electrode portion 114A in a direction (in this example, the first direction D1) perpendicular to the second direction D2 along the surface of the first substrate 110 distal to the second substrate 120.

It should be noted that the ground electrode 114 shown in FIG. 4 is exemplary, and in some embodiments the ground electrode 114 may cover the entire surface of the first substrate 110 distal to the second substrate 120. In other words, the additional electrode portion 114B may be optional in some embodiments.

Referring back to FIG. 2B, the second antenna oscillator 122 has an elongated shape extending in the second direction D2 along a surface of the second substrate 120 distal to the first substrate 110. The second antenna oscillator 122 has a length L2 smaller than a length L1 of the first antenna oscillator 118, and the length L1 of the first antenna oscillator 118 is smaller than the length L3 of the elongated electrode portion 114A. With continued reference to FIG. 2B, the second antenna oscillator 122 is located at a position corresponding to the first antenna oscillator 118 and on the surface of the second substrate 120 distal to the first substrate 110, and the elongated electrode portion 114A is located at a position corresponding to the first antenna oscillator 118 and on the surface of the first substrate 110 distal to the second substrate 120. In other words, an orthographic projection of the second antenna oscillator 122 on the first substrate 110, an orthographic projection of the first antenna oscillator 118 on the first substrate 110, and an orthographic projection of the elongated electrode portion 114A on the first substrate 110 overlap each other. In this case, a three-element directional radiator formed by the second antenna oscillator 122, the first antenna oscillator 118 and the elongated electrode portion 114A may have a higher gain. For example, a frequency of an electromagnetic wave to be transmitted by the liquid crystal antenna unit 100 may be between 1 GHz and 100 GHz (i.e., a wavelength of the electromagnetic wave to be transmitted may be between 3 mm and 300 mm). In this case, the "elongated shape" of the second antenna oscillator 122 may be a rectangular parallelepiped (e.g., a cuboid), the length L1 (i.e., a size in the horizontal direction in FIG. 2B) of the rectangular parallelepiped may be about one-half (½) of the wavelength of the electromagnetic wave to be transmitted, a thickness (i.e., a size in the vertical direction in FIG. 2B) of the rectangular parallelepiped may be between about 3 times a skin depth and about 35 microns, or between about 1 micron and about 35 microns, and a width of the rectangular parallelepiped (i.e., a size in a direction perpendicular to the cross-sectional view shown in FIG. 2B) may be less than about 0.1 times the wavelength of the electromagnetic wave to be transmitted. Further, the first antenna oscillator 118 or the elongated electrode portion 114A may have a shape similar to the "elongated shape" of the second antenna oscillator 122, as long as it suffices that the second antenna oscillator 122 has the length L2 less than the length L1 of the first antenna oscillator 118, and that the length L1 of the first antenna oscillator 118 is less than the length L3 of the elongated electrode portion 114A.

The term "corresponding to" as used herein in connection with the second antenna oscillator 122, the first antenna oscillator 118 and the elongated electrode portion 114A means that, the second antenna oscillator 122, the first antenna oscillator 118 and the elongated electrode portion 114A are positioned in relation to each other such that they form the three-element directional radiator, in which the second antenna oscillator 122 serves as a director, the first antenna oscillator 118 serves as an active oscillator, and the elongated electrode portion 114A serves as a reflector. Specifically, the reflector is positioned at one side of the active oscillator to attenuate an electromagnetic wave transmitted from or emitted toward the one side, and the director is positioned at the other side of the active oscillator to enhance an electromagnetic wave transmitted from or emitted toward the other side. Such a directional radiator may operate in a similar manner to a known Yagi antenna (may also be referred to as Yagi-Uda antenna), the detailed description thereof is therefore omitted here.

In the example of FIG. 2B, the first antenna oscillator 118 is positioned right above the elongated electrode portion 114A, and the second antenna oscillator 122 is positioned right above the first antenna oscillator 118. More specifically, the second antenna oscillator 122, the first antenna oscillator 118 and the elongated electrode portion 114A are arranged such that a center of the second antenna oscillator 122, a center of the gap 119 in the first antenna oscillator 118, and a center of the elongated electrode portion 114A are all located on a straight line, which is as indicated by the dashed line OO', perpendicular to the first substrate 110 or the second substrate 120.

The second antenna oscillator 122, the first antenna oscillator 118 and the elongated electrode portion 114A are suitably arranged depending on the wavelength of the electromagnetic wave. For example, a suitable length L1 of the first antenna oscillator 118 may be one-half of the wavelength of the electromagnetic wave to be transmitted. In some embodiments, the length L2 of the second antenna oscillator 122 is 0.7 to 0.9 times the length L of the first antenna oscillator 118. In an embodiment where the first substrate 110 and the second substrate 120 are made of a same material, the second substrate 120 has a thickness H2 that is 3 to 5 times a thickness H1 of the first substrate 110. In an embodiment where the first substrate 110 and the second substrate 120 are made of different materials, the thickness H1 of the first substrate 110 and the thickness H2 of the second substrate 120 satisfy the following relationship:

$$\frac{3\sqrt{\varepsilon_1}}{\sqrt{\varepsilon_2}} \leq \frac{H2}{H1} \leq \frac{5\sqrt{\varepsilon_1}}{\sqrt{\varepsilon_2}},$$

where $\varepsilon_1$ is a dielectric constant of the first substrate 110, and $\varepsilon_2$ a dielectric constant of the second substrate 120.

In some embodiments, the second substrate 120 may be a composite board including multiple layers of materials (e.g., N layers of materials) to provide a suitable dielectric constant. In this case, the dielectric constant of the second substrate 120 may be a weighted average of the dielectric constants of the multiple layers of materials of the second substrate 120. For example, the dielectric constant $\varepsilon_2$ of the second substrate 120 may be calculated by the following formula:

$$\varepsilon_2 = \sum_{i}^{N} \left( \frac{Ti}{H2} * \varepsilon_{2i} \right),$$

where $$H2 = \sum_{i}^{N} Ti,$$

Ti is a thickness of the i-th layer of material, $\varepsilon_{2i}$ is a dielectric constant of the i-th layer of material, and N is an integer greater than or equal to 2. For example, the outermost layer of the second substrate 120 may be formed even of air. That is, the second antenna oscillator 122 is not directly on the surface of the second substrate 120 distal to the first substrate 110, but is positioned at a distance above the second substrate 120. In this case, the thickness H2 of the second substrate 120 may be a distance between the lower surface of the second substrate 120 and the lower surface of the second antenna oscillator 122, as shown in FIG. 2B. In this case, the second antenna oscillator 122 may be fixed by means of any suitable support means (e.g., a pillar).

It should be noted that although an example arrangement of the second antenna oscillator 122, the first antenna oscillator 118 and the elongated electrode portion 114A is described above with respect to FIGS. 1 and 2B, other embodiments are possible. For example, the first antenna oscillator 118 may be offset by a distance in the first direction D1 with respect to the elongated electrode portion 114A, and the second antenna oscillator 122 may be further offset by a distance in the first direction D1 with respect to the first antenna oscillator 118. Alternatively or additionally, the first antenna oscillator 118 may be offset by a distance in the second direction D2 with respect to the elongated electrode portion 114A, and/or the second antenna oscillator 122 may be offset by a distance in the second direction D2 with respect to the first antenna oscillator 118. In practice, the second antenna oscillator 122, the first antenna oscillator 118 and the elongated electrode portion 114A may be arranged in any suitable manner as long as they can form the three-element directional radiator.

The liquid crystal antenna unit 100 is realized to have a high amplitude gain by means of the directional radiator formed by the second antenna oscillator 122, the first antenna oscillator 118 and the elongated electrode portion 114A.

Figure 5:
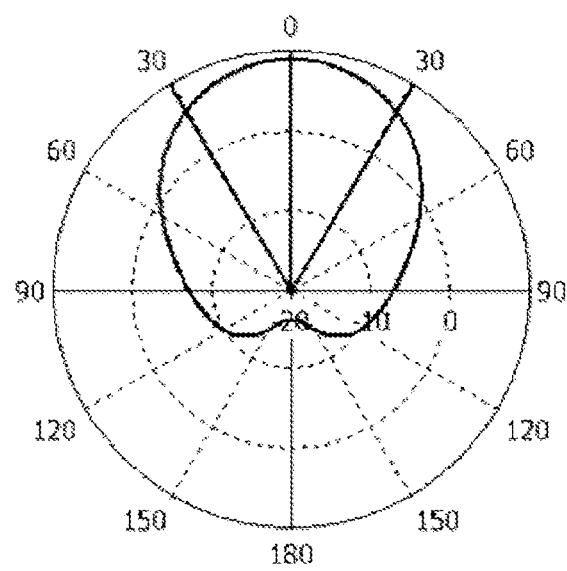
FIG. 5 shows a two-dimensional far-field directional pattern of the liquid crystal antenna unit shown in FIG. 1.

FIG. 5 shows a two-dimensional far-field directional pattern of the liquid crystal antenna unit 100. The directional pattern has been obtained from a software-implemented simulation in which the frequency of the electromagnetic wave is set to 30 GHz. According to the simulation results, an amplitude gain of the main lobe is 8.89 dBi in the main lobe direction of 0 degrees (e.g., the vertically upward direction in FIG. 5). This amplitude gain is higher than the gain of a conventional patch antenna by 2 to 3 dB. Therefore, the liquid crystal antenna unit 100 advantageously achieves an improvement in gain.

Figure 6A:
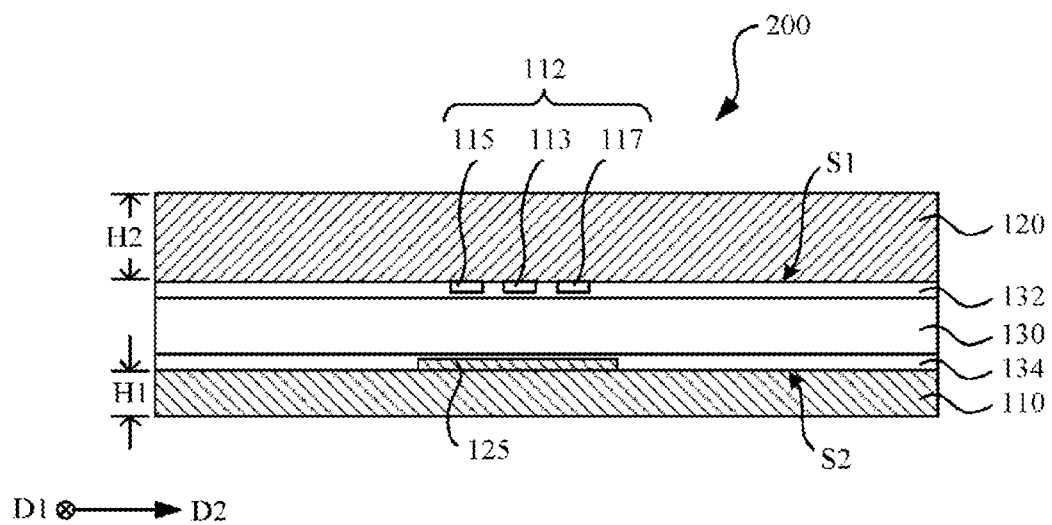
FIGS. 6A and 6B schematically illustrate cross-sectional views of a liquid crystal antenna unit according to another embodiment of the present disclosure.
Figure 6B:
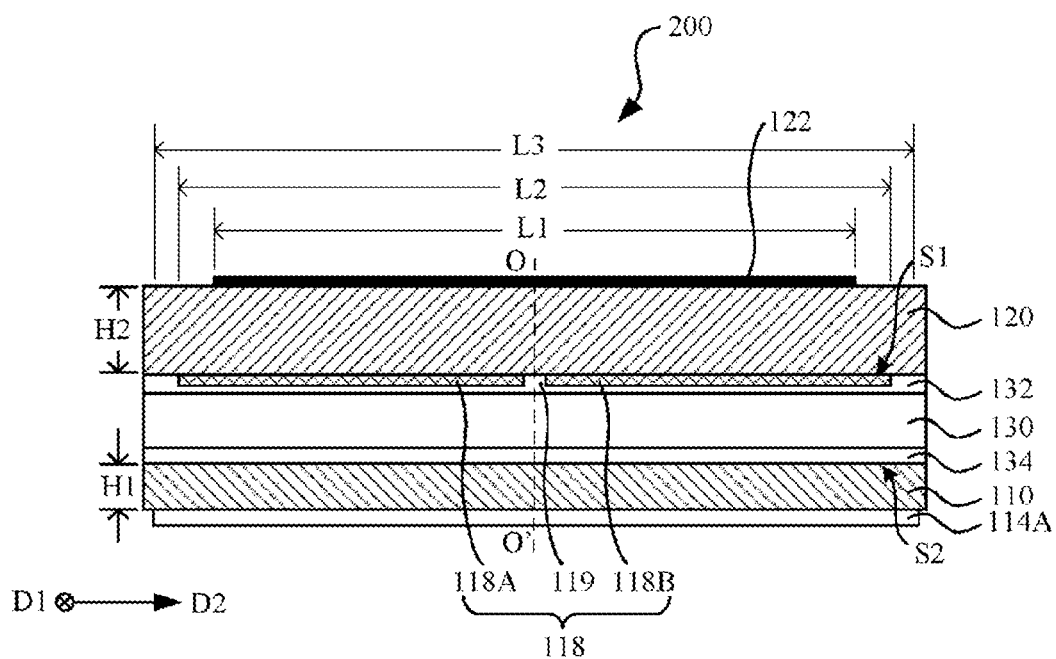

FIGS. 6A and 6B schematically illustrate cross-sectional views of a liquid crystal antenna unit 200 according to another embodiment of the present disclosure.

Similar to FIG. 2A, FIG. 6A shows an example arrangement of the transmission line 112 and one of the electrodes 125 of the electrode structure 124. Unlike the liquid crystal antenna unit 100, in the liquid crystal antenna unit 200, the first surface S1 is defined as a surface of the second substrate 120 proximal to the first substrate 110, and the second surface S2 is defined as a surface of the first substrate 110 proximal to the second substrate 120. Thus, in the present embodiment, the transmission line 112 is located on the surface of the second substrate 120 proximal to the first substrate 110, and the electrodes 125 of the electrode structure 124 are located on the surface of the first substrate 110 proximal to the second substrate 120.

Similar to FIG. 2B, FIG. 6B shows an example arrangement of the second antenna oscillator 122, the first antenna oscillator 118 and the elongated electrode portion 114A. Unlike the liquid crystal antenna unit 100, in the liquid crystal antenna unit 200, the first antenna oscillator 118 is located on the surface of the second substrate 120 proximal to the first substrate 110.

In addition to the differences described here, the details and variations of the liquid crystal antenna unit 100 described above with respect to FIGS. 1 to 5 may also be applicable to the liquid crystal antenna unit 200, and thus are not repeated here.

Figure 7:
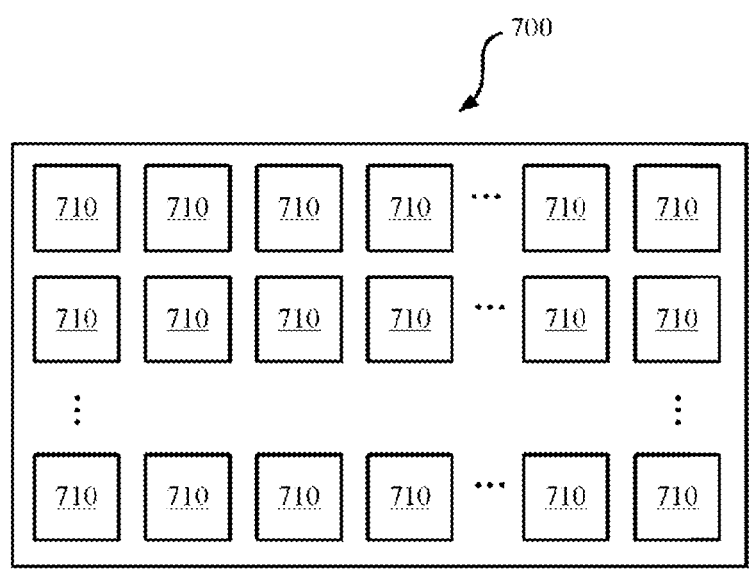
FIG. 7 schematically illustrates a block diagram of a liquid crystal phased array antenna according to an embodiment of the present disclosure.

FIG. 7 schematically illustrates a block diagram of a liquid crystal phased array antenna 700 according to an embodiment of the present disclosure.

Referring to FIG. 7, the liquid crystal phased array antenna 700 includes a plurality of liquid crystal antenna units 710 arranged in an array. Each of the plurality of liquid crystal antenna units 710 may take the form of the above-described liquid crystal antenna unit 100 or liquid crystal antenna unit 200 or a variation thereof, and a detailed description thereof is thus omitted herein. The plurality of liquid crystal antenna units 710 may be applied with different voltages through a feeding network (not shown), respectively, so as to change a phase of an electromagnetic wave signal, thereby implementing the functions of beam scanning and beam forming. Advantageously, each of the liquid crystal antenna units 710 may provide a higher gain than that of a conventional patch antenna unit.

In some embodiments, the first substrates (e.g., the first substrates 110) of the plurality of liquid crystal antenna units 710 as a whole are formed to be a single (i.e., one) substrate, and the second substrates (e.g., the second substrates 120) of the plurality of liquid crystal antenna units 710 as a whole are formed to be another single substrate. This facilitates mass production of the liquid crystal phased array antenna. Alternatively, the liquid crystal phased array antenna 700 may be formed by combining a plurality of separate liquid crystal antenna units 710.

The liquid crystal phased array antenna 700 may provide a high gain because each antenna unit 710 as described above may provide a high gain. The liquid crystal phased array antenna 700 may provide a higher gain than a conventional liquid crystal phased array antenna, in a case of a same antenna array size. This improves the communication performance.

The liquid crystal phased array antenna 700 may also have a small size because each antenna unit 710 may be formed to have a smaller size than a conventional patch antenna unit while still providing a same gain. The liquid crystal phased array antenna 700 may have a size of about ½ of a size of a conventional liquid crystal phased array antenna, in a case where they include the same number of antenna units. As such, a space for arranging the antenna may be reduced.

Variations to the disclosed embodiments may be understood and carried out by one of ordinary skill in the art in practicing the claimed subject matter, from a study on the drawings, the present disclosure, and the appended claims. In the claims, the word "comprising" does not exclude other elements or steps, and the indefinite article "a" or "an" does not exclude a plurality. The additional features recited in different dependent claims may be combined with each other to form new solutions in a case of no obvious conflict.

What is claimed is:

1. A liquid crystal antenna unit, comprising:
a first substrate;
a second substrate opposite to the first substrate;
a liquid crystal layer between the first substrate and the second substrate;
a transmission line on a first surface and arranged to extend in a first direction along the first surface, wherein the first surface is one of a surface of the first substrate proximal to the second substrate and a surface of the second substrate proximal to the first substrate;
a first antenna oscillator on the first surface and arranged as an elongated dipole extending in a second direction along the first surface, wherein the dipole comprises two poles spaced apart from each other by a gap, and the first antenna oscillator is configured to couple an electromagnetic wave between the two poles and the transmission line at the gap;
a second antenna oscillator on a surface of the second substrate distal to the first substrate and at a position corresponding to the first antenna oscillator, wherein the second antenna oscillator has an elongated shape extending in the second direction along the surface of the second substrate distal to the first substrate, and a length of the second antenna oscillator is less than a length of the first antenna oscillator; and a ground electrode on a surface of the first substrate distal to the second substrate, wherein the ground electrode comprises an elongated electrode portion at a position corresponding to the first antenna oscillator, the elongated electrode portion extends in the second direction along the surface of the first substrate distal to the second substrate, and a length of the elongated electrode portion is greater than the length of the first antenna oscillator.

2. The liquid crystal antenna unit according to claim 1, wherein the length of the second antenna oscillator is 0.7 to 0.9 times the length of the first antenna oscillator, and the length of the first antenna oscillator is less than the length of the elongated electrode portion.

3. The liquid crystal antenna unit according to claim 2, wherein the first substrate and the second substrate comprise a same material, and the second substrate has a thickness that is 3 to 5 times as large as a thickness of the first substrate.

4. The liquid crystal antenna unit according to claim 2, wherein the first substrate and the second substrate comprise different materials, respectively, and a thickness of the first substrate and a thickness of the second substrate satisfy the following relationship:

$$\frac{3\sqrt{\varepsilon_1}}{\sqrt{\varepsilon_2}} \le \frac{H2}{H1} \le \frac{5\sqrt{\varepsilon_1}}{\sqrt{\varepsilon_2}},$$

where H1 is the thickness of the first substrate, H2 is the thickness of the second substrate, $\varepsilon_1$ is a dielectric constant of the first substrate, and $\varepsilon_2$ is a dielectric constant of the second substrate.

5. The liquid crystal antenna unit according to claim 1, wherein the first substrate and the second substrate comprise a same material, and the second substrate has a thickness that is 3 to 5 times as large as a thickness of the first substrate.

6. The liquid crystal antenna unit according to claim 1, wherein the first substrate and the second substrate comprise different materials, respectively, and a thickness of the first substrate and a thickness of the second substrate satisfy the following relationship:

$$\frac{3\sqrt{\varepsilon_1}}{\sqrt{\varepsilon_2}} \le \frac{H2}{H1} \le \frac{5\sqrt{\varepsilon_1}}{\sqrt{\varepsilon_2}},$$

where H1 is the thickness of the first substrate, H2 is the thickness of the second substrate, $\varepsilon_1$ is a dielectric constant of the first substrate, and $\varepsilon_2$ is a dielectric constant of the second substrate.

7. The liquid crystal antenna unit according to claim 6, wherein the second substrate is a composite board comprising N layers of materials, and the dielectric constant $\varepsilon_2$ of the second substrate is calculated according to the following formula:

$$\varepsilon_2 = \sum_i^N \left( \frac{Ti}{H2} * \varepsilon_{2i} \right)$$

where $$H2 = \sum_i^N Ti,$$

Ti is a thickness of an i-th layer of material, $\varepsilon_{2i}$ is a dielectric constant of the i-th layer of material, and N is an integer greater than or equal to 2.

8. The liquid crystal antenna unit according to claim 1, wherein the second substrate is a composite board comprising N layers of materials, where N is an integer greater than or equal to 2.

9. The liquid crystal antenna unit according to claim 1, wherein the second antenna oscillator, the first antenna oscillator, and the elongated electrode portion are arranged such that a center of the second antenna oscillator, a center of the gap in the first antenna oscillator, and a center of the elongated electrode portion are all on a straight line perpendicular to the first substrate or the second substrate.

10. The liquid crystal antenna unit according to claim 1, wherein the first direction is perpendicular to the second direction.

11. The liquid crystal antenna unit according claim 1, wherein the transmission line comprises a coplanar waveguide transmission line comprising a signal line and two ground wires respectively on both sides of the signal line.

12. The liquid crystal antenna unit according to claim 11, wherein one end of the signal line is electrically connected to one end, which is proximal to the gap, of one pole of the two poles of the dipole, and one end of one ground wire, which is closer to the other pole of the two poles of the dipole, of the two ground wires, is electrically connected to one end of the other pole proximal to the gap.

13. The liquid crystal antenna unit according to claim 11, wherein the first surface is the surface of the first substrate proximal to the second substrate, the liquid crystal antenna unit further comprises an electrode structure on a second surface, and the second surface is the surface of the second substrate proximal to the first substrate.

14. The liquid crystal antenna unit according to claim 13, wherein the electrode structure comprises a plurality of electrodes parallel to each other and extending along the second surface in a direction perpendicular to the first direction.

15. The liquid crystal antenna unit according to claim 11, wherein the first surface is the surface of the second substrate proximal to the first substrate, the liquid crystal antenna unit further comprises an electrode structure on a second surface, and the second surface is the surface of the first substrate proximal to the second substrate.

16. The liquid crystal antenna unit according to claim 1, wherein the ground electrode further comprises an additional electrode portion extending from the elongated electrode portion in a direction perpendicular to the second direction along the surface of the first substrate distal to the second substrate.

17. The liquid crystal antenna unit according to claim 1, wherein an orthographic projection of the first antenna oscillator on the first substrate, an orthographic projection of the second antenna oscillator on the first substrate, and an orthographic projection of the elongated electrode portion on the first substrate overlap each other.

18. The liquid crystal antenna unit according to claim 1, wherein a thickness of the liquid crystal layer is less than 100 μm.

19. A liquid crystal phased array antenna, comprising a plurality of liquid crystal antenna units in an array, wherein each of the plurality of liquid crystal antenna units is the liquid crystal antenna unit according to claim 1.

20. The liquid crystal phased array antenna according to claim 19, wherein the first substrates of the plurality of liquid crystal antenna units as a whole are a single substrate, and the second substrates of the plurality of liquid crystal antenna units as a whole are another single substrate.

* * * * *